US012811263B2

(12) United States Patent
Shimizu et al.

(10) Patent No.: US 12,811,263 B2
(45) Date of Patent: Nov. 24, 2026

(54) ALL-SOLID-STATE BATTERY

(71) Applicant: HONDA MOTOR CO., LTD., Tokyo (JP)

(72) Inventors: Ryo Shimizu, Wako (JP); Takuya Taniuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 908 days.

(21) Appl. No.: 18/099,603

(22) Filed: Jan. 20, 2023

(65) Prior Publication Data

US 2023/0261348 A1 Aug. 17, 2023

(30) Foreign Application Priority Data

Feb. 17, 2022 (JP) ................................ 2022-022945

(51) Int. Cl.
*H01M 50/583* (2021.01)
*H01M 4/134* (2010.01)
*H01M 4/02* (2006.01)

(52) U.S. Cl.
CPC ......... *H01M 50/583* (2021.01); *H01M 4/134* (2013.01); *H01M 2004/027* (2013.01); *H01M 2200/105* (2013.01)

(58) Field of Classification Search
CPC ............... H01M 50/583; H01M 4/134; H01M 2004/027; H01M 2200/105
USPC .......................................................... 429/163
See application file for complete search history.

(56) References Cited

U.S. PATENT DOCUMENTS

| | | | |
|---|---|---|---|
| 7,868,173 | B2 | 1/2011 | Patel et al. |
| 10,103,376 | B2 | 10/2018 | Sugiura |
| 11,909,003 | B2 | 2/2024 | Waseda |
| 12,206,075 | B2 | 1/2025 | Waseda |
| 12,374,715 | B2 | 7/2025 | Koga |

(Continued)

FOREIGN PATENT DOCUMENTS

| | | | |
|---|---|---|---|
| CN | 106816640 | A | 6/2017 |
| CN | 110783635 | A | 2/2020 |

(Continued)

OTHER PUBLICATIONS

Machine translation of JP 2021-072262 A (Year: 2021).*

(Continued)

*Primary Examiner* — Kevin P Kerns
(74) *Attorney, Agent, or Firm* — WHDA, LLP

(57) ABSTRACT

An all-solid-state battery includes a laminated body in which a positive electrode layer, a solid electrolyte layer and a negative electrode layer are laminated, an outer package configured to enclose and seal in the laminated body, and an overcharge suppression part configured to be enclosed and sealed in the outer package together with the laminated body and be capable of short-circuiting a positive electrode collector of the positive electrode layer and a negative electrode collector of the negative electrode layer. The overcharge suppression part includes a first conductor extending from one of the positive electrode collector and the negative electrode collector, and a second conductor extending from another of the positive electrode collector and the negative electrode collector and separated from the first conductor. The first and second conductors are conducted by a state change of the laminated body.

14 Claims, 7 Drawing Sheets

(56) References Cited

U.S. PATENT DOCUMENTS

| | | | |
|---|---|---|---|
| 2007/0054157 | A1 | 3/2007 | Ryu et al. |
| 2020/0036044 | A1 | 1/2020 | Waseda |

FOREIGN PATENT DOCUMENTS

| | | | | | |
|---|---|---|---|---|---|
| JP | 2003-109668 | A | | 4/2003 | |
| JP | 2004-319463 | A | | 11/2004 | |
| JP | 2005-044626 | A | | 2/2005 | |
| JP | 2009-529029 | A | | 8/2009 | |
| JP | 2011-142040 | A | | 7/2011 | |
| JP | 2013-131461 | A | | 7/2013 | |
| JP | 2014-022284 | A | | 2/2014 | |
| JP | 2016-110940 | A | | 6/2016 | |
| JP | 2016-110959 | A | | 6/2016 | |
| JP | 2019-102206 | A | | 6/2019 | |
| JP | 2021-072262 | A | * | 5/2021 | .......... H01M 10/052 |
| KR | 2016-0043368 | A | | 4/2016 | |
| WO | 2018/025595 | A1 | | 2/2018 | |
| WO | 2021/166422 | A1 | | 8/2021 | |

OTHER PUBLICATIONS

Office Action dated Apr. 15, 2026, issued in counterpart CN Application No. 202310058284.9, with English translation. (18 pages).

Office Action dated Sep. 19, 2025, issued in counterpart JP Application No. 2022-022945, with English translation.(10 pages).

* cited by examiner

ALL-SOLID-STATE BATTERY

CROSS-REFERENCE TO RELATED APPLICATION(S)

This application claims priority to and the benefit of Japanese Patent Application No. 2022-022945 filed on Feb. 17, 2022, the entire disclosure of which is incorporated herein by reference.

BACKGROUND OF THE INVENTION

Field of the Invention

The present invention relates to an all-solid-state battery.

Description of the Related Art

Electrification of industrial machines has been promoted to reduce $CO_2$ from a viewpoint of climate-related disasters, and a secondary battery has been studied also for use in vehicles or the like as the energy source. A secondary battery may be caused to expand and generate heat due to being overcharged. As a countermeasure for that, for example, a secondary battery including a structure of discharging electricity when overcharged has been proposed. Japanese Patent Laid-Open No. 2016-110959 discloses an aqueous secondary battery including a structure of short-circuiting a positive electrode and a negative electrode outside an outer package, in the aqueous secondary battery in which an electrode layer or the like is enclosed and sealed in the outer package.

Since a discharging structure in Japanese Patent Laid-Open No. 2016-110959 is arranged outside the outer package and is exposed, it is necessary to be careful not to damage the discharging structure when handling it, and time and labor may be needed in assembly or the like when using the secondary battery of Japanese Patent Laid-Open No. 2016-110959 as a battery pack.

SUMMARY OF THE INVENTION

An object of the present invention is to provide an all-solid-state battery capable of suppressing overcharge with no special structure being disposed outside an outer package.

According to an aspect of the present invention, there is provided an all-solid-state battery comprising: a laminated body in which a positive electrode layer, a solid electrolyte layer and a negative electrode layer are laminated; an outer package configured to enclose and seal in the laminated body and being capable of following deformation in a lamination direction of the laminated body; and an overcharge suppression part configured to be enclosed and sealed in the outer package together with the laminated body and be capable of short-circuiting a positive electrode collector of the positive electrode layer and a negative electrode collector of the negative electrode layer, wherein the overcharge suppression part includes: a first conductor extending from one of the positive electrode collector and the negative electrode collector; and a second conductor extending from another of the positive electrode collector and the negative electrode collector and separated from the first conductor, and the first conductor and the second conductor are conducted by a state change of the laminated body.

Further features of the present invention will become apparent from the following description of exemplary embodiments (with reference to the attached drawings).

DESCRIPTION OF THE EMBODIMENTS

Figure 1A:
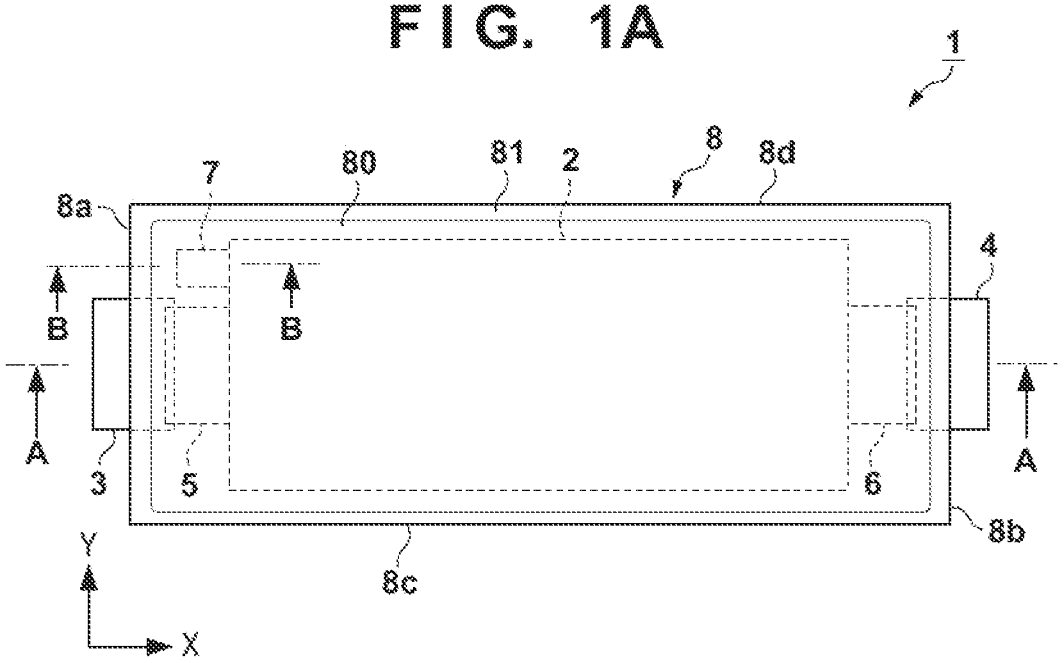
FIG. 1A is a plan view of an all-solid-state battery according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1B:
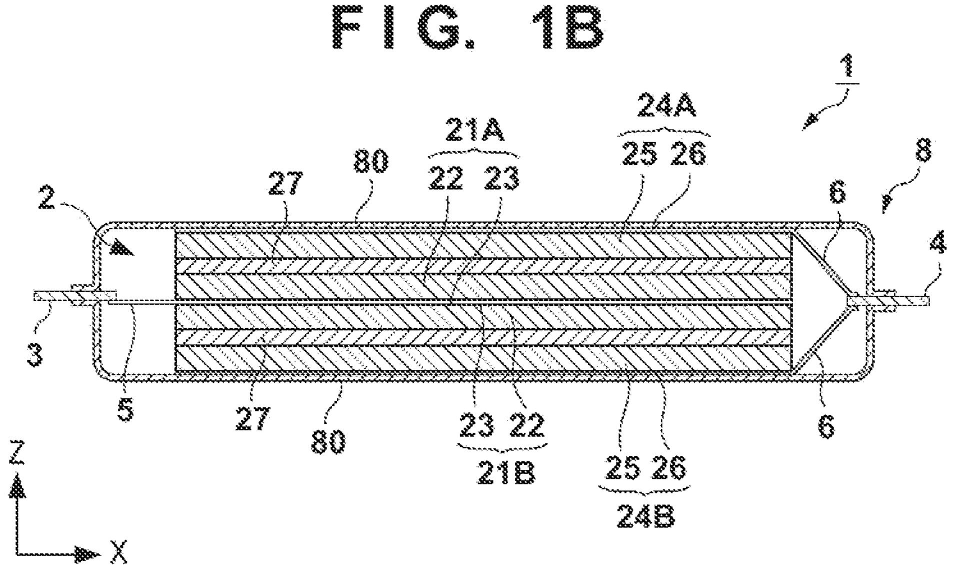
FIG. 1B is an A-A line sectional view of FIG. 1A.

FIG. 1A is a plan view of an all-solid-state battery 1 according to an embodiment of the present invention, and FIG. 1B is an A-A line sectional view of FIG. 1A. In the figures, an arrow X indicates a longitudinal direction of the all-solid-state battery 1 (or an extending direction of a lead tab), an arrow Y indicates a width direction of the all-solid-state battery 1 (or a direction orthogonal to the extending direction of the lead tab), an arrow Z indicates a thickness direction of the all-solid-state battery 1 (a lamination direction of a laminated body 2) respectively, and an X direction, a Y direction and a Z direction are orthogonal to each other. FIG. 1A is a diagram viewing the all-solid-state battery 1 in the Z direction.

The all-solid-state battery 1 includes a laminated body 2 which is a storage element, an outer package 8 which encloses and seals in the laminated body 2, lead tabs 3 and 4, collector tabs 5 and 6 and an overcharge suppression part 7, and has a form of a battery cell suitable for a battery pack.

The laminated body 2 has a rectangular parallelepiped shape as a whole and includes two positive electrode layers 21A and 21B and two negative electrode layers 24A and 24B so that the positive electrode layer and the negative electrode layer have a two-layered structure. However, as the laminated body 2, the positive electrode layer and the negative electrode layer may be one layer or may be three or more layers. A solid electrolyte layer 27 is provided between the positive electrode layer 21A and the negative electrode layer 24A and between the positive electrode layer 21B and the negative electrode layer 24B respectively.

The positive electrode layers 21A and 21B include a positive electrode active material layer 22 respectively, and include a positive electrode collector 23 in common to the two positive electrode layers 21A and 21B. The positive electrode collector 23 is arranged in a layer shape at a center in the Z direction of the laminated body 2, and the individual positive electrode active material layers 22 are laminated on two sides thereof.

The negative electrode layers 24A and 24B are arranged on an outer side in one direction and on the outer side in the other direction of the Z direction to the positive electrode layers 21A and 21B, and they are laminated such that the positive electrode layers 21A and 21B are held between the negative electrode layers 24A and 24B. However, contrary to a configuration of the present embodiment, the configuration of laminating them such that the two negative electrode layers are held between the two positive electrode layers is also adoptable. The negative electrode layers 24A and 24B each include a negative electrode active material layer 25 and a negative electrode collector 26. The two negative electrode collectors 26 are formed in the layer shape respectively in an outermost layer of the laminated body 2.

Examples of an active material configuring the positive electrode active material layer 22 are lithium cobalt oxide, lithium nickelate oxide, lithium manganese oxide and lithium metal phosphate. In addition, examples of the active material configuring the negative electrode active material layer 25 are a lithium-based material and a silicon-based material. Examples of the lithium-based material are an Li metal and an Li alloy. Examples of the silicon-based material are Si and SiO. Examples of the active material configuring the negative electrode active material layer 25 are, in addition, a carbon material such as graphite, soft carbon and hard carbon, a tin-based material (such as Sn and SnO) as a material of relatively large volume expansion, and lithium titanate.

The solid electrolyte layer 27 is, for example, formed of an electrolyte in a solid shape having ion conductivity, and examples of the material are a sulfide-based solid electrolyte material, an oxide-based solid electrolyte material, a nitride-based solid electrolyte material and a halide-based solid electrolyte material. The positive electrode collector 23 and the negative electrode collector 26 are formed of metal foil, a metal sheet or a metal plate of aluminum, copper and SUS or the like, for example. The positive electrode active material layer 22, the negative electrode active material layer 25 and the solid electrolyte layer 27 may be formed by binding particles of the materials configuring them by an organic polymer compound based binder.

The outer package 8 has a rectangular shape having four sides 8*a* to 8*d* as viewed in the Z direction, includes a recessed part 80 in a cup shape at the center, and includes a sealing part 81 at the peripheral edge. The outer package 8 is formed by folding one sheet-like material into two or sticking two sheet-like materials together. The material is formed by covering front and back surfaces of a metal layer with a resin layer (insulating layer) for example, and the outer package 8 has flexibility capable of following expansion/contraction of the laminated body 2. The flexibility capable of following the expansion/contraction of the laminated body 2 can be obtained by a characteristic of the material of the outer package 8 and a shape of the outer package 8.

The recessed part 80 is formed respectively in both directions in the Z direction so as to house the laminated body 2, and a housing space in the rectangular parallelepiped shape is formed by the pair of recessed parts 80. The housing space is also referred to as an inside of the outer package 8. The sealing part 81 is formed by sticking the material of the outer package 8 together by adhesion or welding or the like. Of the four sides 8*a* to 8*d*, the sides 8*a* and 8*b* facing each other are provided with the lead tabs 3 and 4 in a belt shape so as to cross the sealing part 81, and the laminated body 2 is positioned between the lead tab 3 and the lead tab 4. By connecting the lead tabs 3 and 4 to a charger or an electric load, the laminated body 2 can be charged or discharged.

One end of the lead tab 3 is positioned outside the outer package 8 and the other end is positioned inside the outer package 8 respectively. The other end of the lead tab 3 is connected to the positive electrode collector 23 via the collector tab 5 inside the outer package 8, and the lead tab 3 forms a tab for a positive electrode. The lead tab 3 and the collector tab 5 are formed of a conductive metal sheet or metal plate, for example.

One end of the lead tab 4 is positioned outside the outer package 8 and the other end is positioned inside the outer package 8 respectively. The other end of the lead tab 4 is connected to the negative electrode collector 26 via the collector tab 6 inside the outer package 8, and the lead tab 4 forms a tab for a negative electrode. The lead tab 4 and the collector tab 6 are formed of a conductive metal sheet or metal plate, for example.

Figure 2B:
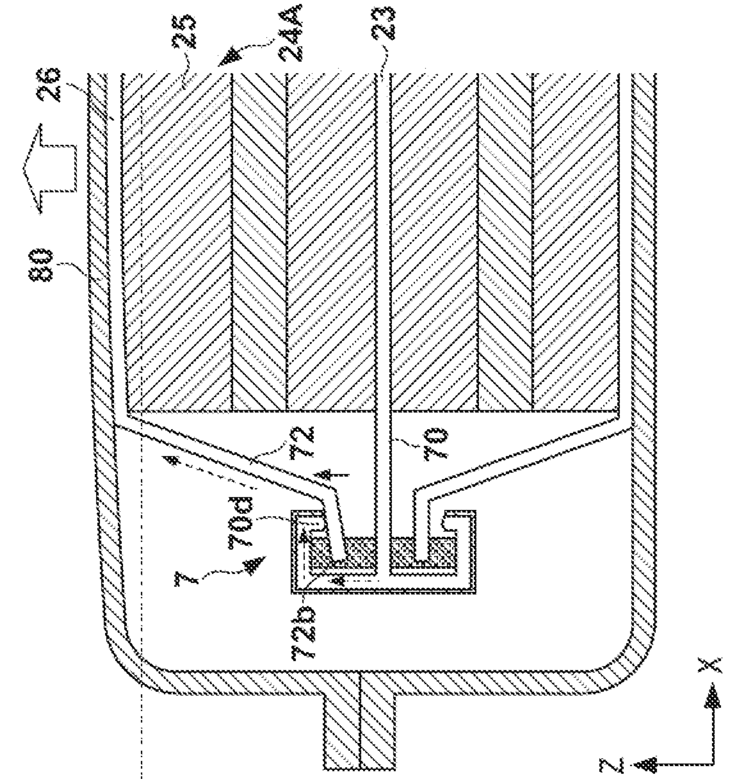
FIG. 2B is a diagram illustrating an action of an overcharge suppression part.
Figure 2A:
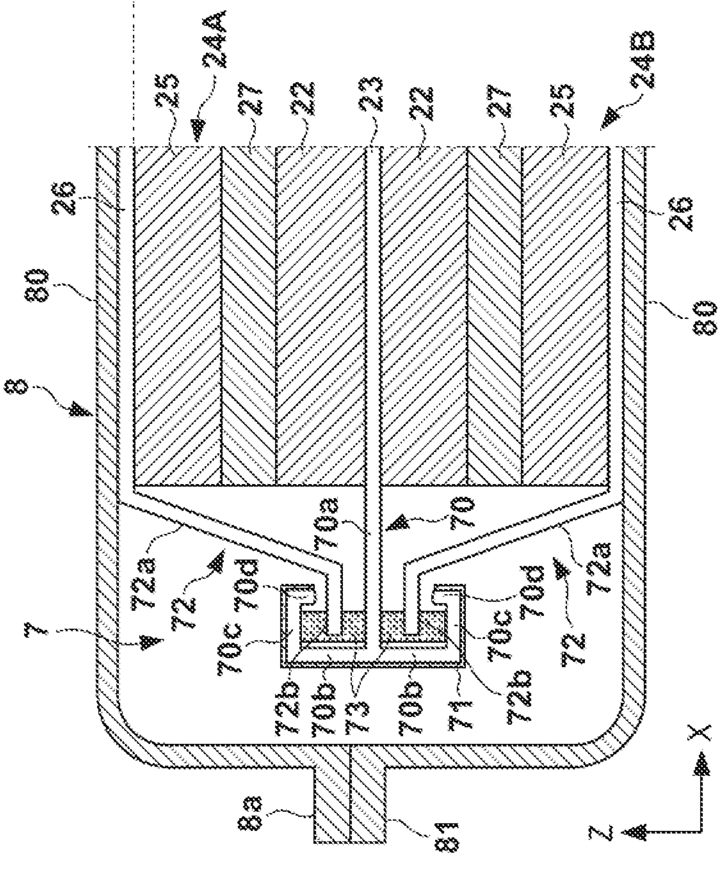
FIG. 2A is a B-B line sectional view of FIG. 1A.

The overcharge suppression part 7 is arranged inside the outer package 8 and is arranged by utilizing a free space between the laminated body 2 and the side 8*a* in particular. FIG. 2A is a B-B line sectional view of FIGS. 1A and 1*s* a sectional view of the overcharge suppression part 7.

The overcharge suppression part 7 causes self-discharge of the laminated body 2 by short-circuiting the positive electrode collector 23 and the negative electrode collector 26 by a state change of the laminated body 2, and suppresses overcharge of the laminated body 2. In the present embodiment, the positive electrode collector 23 and the negative electrode collector 26 are short-circuited by utilizing the expansion in the Z direction of the laminated body 2 as the state change of the laminated body 2. The overcharge suppression part 7 is provided independent of the lead tabs 3 and 4 and the collector tabs 5 and 6.

The overcharge suppression part 7 includes a conductor 70 extending from the positive electrode collector 23 and conductors 72 extending from the individual negative electrode collectors 26. The conductor 70 and the conductors 72 are formed of a conductive metal plate for example. The conductor 70 is formed integrally with the positive electrode collector 23, or is prepared as a member separate from the positive electrode collector 23 and joined to the positive electrode collector 23. Similarly, each conductor 72 is formed integrally with the negative electrode collector 26, or is prepared as a member separate from the negative electrode collector 26 and joined to the negative electrode collector 26.

The conductor 70 includes an extension part 70*a* extending in the direction of separating from the laminated body 2 in the X direction from the end of the positive electrode collector 23, and a pair of extension parts 70*b* bent by 90 degrees from the extension part 70*a* and extending in the direction of separating from the extension part 70*a* in the Z direction. The conductor 70 further includes extension parts 70*c* bent by 90 degrees from the individual extension parts 70*b* and extending in the direction of approaching the laminated body 2 in the X direction, and extension parts 70*d* bent by 90 degrees from the extension parts 70*c* and extending in the direction of approaching the extension part 70*a* in the Z direction.

The extension parts 70*a* to 70*d* are formed in a C shape in the sectional shape (X-Z sectional shape), and the conductor 70 has two parts formed in the C shape corresponding to the two conductors 72. An outer side surface of the extension parts 70*b* to 70*d* is covered with an insulating layer 71 formed of an insulating material such as resin to prevent the conductor 70 and the conductors 72 from causing conduction by unintended contact.

The individual conductor 72 includes an extension part 72*a* extending while being inclined toward the extension part 70*a* from the end of the negative electrode collector 26, and an end part 72*b* bent from the extension part 72*a* and extending in the direction of separating from the laminated body 2 in the X direction. The end part 72*b* is inserted between the extension part 70*a* and the extension part 70*c*. Between the extension part 70*a* and the extension part 70*c*, a support member 73 is provided to fill the gap between them. The support member 73 is formed of elastically deformable resin for example, and supports the end part 72*b*.

A distal end of the extension part 70*d* and the end part 72*b* form an electric contact part of the conductor 70 and the conductor 72 respectively, and are arranged such that the distal end of the extension part 70*d* faces the end part 72*b* having a flat surface.

An action of the overcharge suppression part 7 configured such will be explained with reference to FIG. 2A and FIG. 2B. When the laminated body 2 is appropriately charged and discharged, the extension part 70*d* and the end part 72*b* are separated and are not in contact as illustrated in FIG. 2A, and the conductor 70 and the conductor 72 are not conducted. That is, the positive electrode collector 23 and the negative electrode collector 26 are not short-circuited.

On the other hand, when the laminated body 2 is charged and is overcharged, the laminated body 2 is expanded in the Z direction and the outer package 8 also follows the deformation. By the expansion, as illustrated in FIG. 2B, the conductor 72 is displaced to the outer side in the Z direction as illustrated by a solid line arrow in FIG. 2B, and the distal end of the extension part 70*d* and the end part 72*b* are brought into contact as a result. Since the end part 72*b* has the flat surface, when the laminated body 2 is expanded, the distal end of the extension part 70*d* is more certainly brought into contact with the end part 72*b*. Note that an example in FIG. 2B illustrates the case where the negative electrode layer 24A is expanded.

When the distal end of the extension part 70*d* and the end part 72*b* are brought into contact, the conductor 70 and the conductor 72 are conducted. As a result, the positive electrode collector 23 and the negative electrode collector 26 are short-circuited to cause the self-discharge (a broken line arrow in FIG. 2B illustrates a current flowing direction). As a result, the overcharge of the laminated body 2 is suppressed.

When charging to the laminated body 2 is ended and a situation is to discharge electric power to the electric load, the expanded negative electrode layer 24A is contracted to an original size. Then, the overcharge suppression part 7 also returns to a state of FIG. 2A and the extension part 70*d* and the end part 72*b* are separated again and turned to the state of not being in contact. Therefore, the conductor 70 and the conductor 72 are not conducted and the positive electrode collector 23 and the negative electrode collector 26 return to the state of not being short-circuited.

That is, in the overcharge suppression part 7, the conductor 70 and the conductor 72 are reversibly brought into contact by the expansion in the Z direction of the laminated body 2, and are turned to a non-contact state when the laminated body 2 is contracted. Thus, even when the laminated body 2 temporarily falls into an overcharged state, the laminated body 2 can be continuously used.

As described above, in the present embodiment, since the overcharge suppression part 7 is arranged inside the outer package 8, the all-solid-state battery can be provided which is capable of suppressing the overcharge with no special structure being disposed outside the outer package. The overcharge suppression part 7 suppresses the overcharge by the contact of the conductor 70 and the conductor 72 when the laminated body 2 is expanded. Differently from the aqueous secondary battery, there is no liquid inside the outer package 8 of the all-solid-state battery 1. Therefore, short-circuit and short-circuit cancellation of the positive electrode collector 23 and the negative electrode collector 26 can be more certainly performed by utilizing contact and separation of the conductor 70 and the conductor 72 inside the outer package 8.

In addition, the end part 72*b* forming the electric contact part is arranged so as to be surrounded by the extension parts 70*a* to 70*c* and the contact and separation of the end part 72*b* and the extension part 70*d* are performed at a narrow location. By limiting the location of the electric contact part, the conductor 70 and the conductor 72 can be more stably brought into contact and separated.

Further, since the conductor 72 is provided respectively corresponding to the individual negative electrode layers 24A and 24B, even when a degree of the expansion is different for each of the negative electrode layers 24A and 24B, the negative electrode layer 24A and the positive electrode layer 21A and the negative electrode layer 24B and the positive electrode layer 21B can be individually short-circuited. In other words, the positive and negative electric layers which have not fallen into the overcharge are not short-circuited. In addition, in the present embodiment, since the negative electrode layers 24A and 24B are positioned on the outer side of the positive electrode layers 21A and 21B in the Z direction, it is effective in particular when using a material with a relatively high degree of the expansion at the time of the overcharge, such as a lithium-based material and a silicon-based material, as the material of the negative electrode active material layer 25.

Second Embodiment

In the overcharge suppression part 7 in the first embodiment, the conductor 70 and the conductor 72 are reversibly brought into contact by the expansion in the Z direction of the laminated body 2, and are turned to the non-contact state when the laminated body 2 is contracted. On the extension parts 70*a* to 70*d*, a load repeatedly acts by the reversible contact with the end part 72*b*. In the present embodiment, a structure which reduces fatigue of the extension parts 70*a* to 70*d* is provided.

Figure 3B:
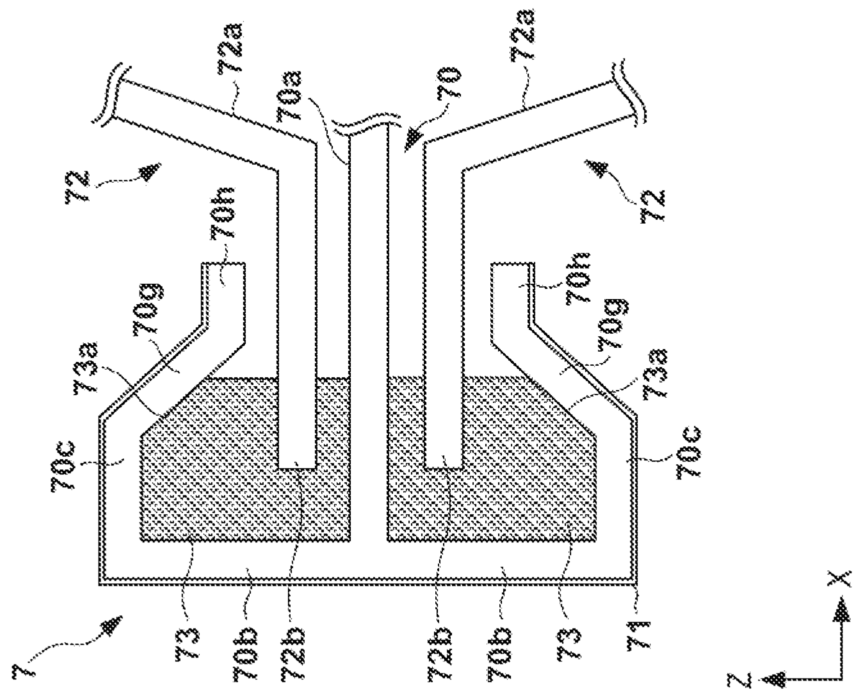
FIG. 3A and FIG. 3B are diagrams illustrating another configuration example of the overcharge suppression part.
Figure 3A:
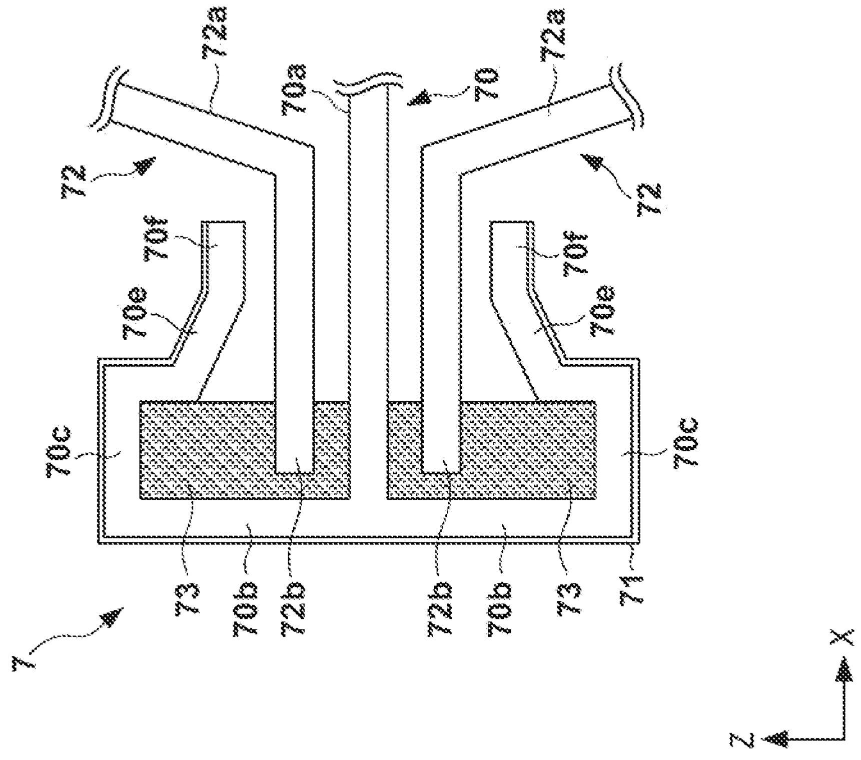

FIG. 3A illustrates one example thereof. In the example in FIG. 3A, a part corresponding to the extension part 70*d* in the first embodiment is configured by an inclined part 70*e* and a flat part 70*f*. The inclined part 70*e* is inclined in the direction of approaching the end part 72*b* from the side of the extension part 70*c*. The flat part 70*f* extends from the end (the end on the end part 72*b* side) of the inclined part 70*e*, and forms a flat surface to function as the electric contact part to be in contact with the end part 72*b*.

In the example in FIG. 3A, when the conductor 72 is displaced and brought into contact with the flat part 70*f* by the expansion of the laminated body 2, the inclined part 70*e* is easily elastically deformed in the direction of changing the inclination angle. When the conductor 72 and the conductor 70 are brought into contact, the load received by the conductor 70 is absorbed at the inclined part 70*e* so that stress can be prevented from acting on the entire conductor 70.

FIG. 3B illustrates another example. In the example in FIG. 3B, the part corresponding to the extension part 70*d* in the first embodiment is configured by an inclined part 70*g* and a flat part 70*h*. The inclined part 70*g* is inclined in the direction of approaching the end part 72*b* from the side of the extension part 70*c*. The flat part 70*h* extends from the end (the end on the end part 72*b* side) of the inclined part 70*g*, and functions as the electric contact part to be in contact with the end part 72*b*.

The support member 73 has a part 73*a* along the inclined part 70*g*. In the illustrated example, the part 73*a* is an inclined part along an inclination of the inclined part 70*g*, but may be a circular arc shape part (R shape part) along the inclined part 70*g*.

In the example in FIG. 3B, when the conductor 72 is displaced and brought into contact with the flat part 70*h* by the expansion of the laminated body 2, the inclined part 70*g* is easily elastically deformed in the direction of changing the inclination angle. When the conductor 72 and the conductor 70 are brought into contact, the load received by the conductor 70 is absorbed at the inclined part 70*g* so that the stress can be prevented from acting on the entire conductor 70. While the inclined part 70*g* and the part 73*a* of the support member 73 may be brought into contact or separated by the elastic deformation of the inclined part 70*g*, since the part 73*a* is formed along the inclined part 70*g* it is possible to suppress the action of large stress between the inclined part 70*g* and the support member 73 when the inclined part 70*g* and the part 73*a* of the support member 73 are brought into contact. Thus, wear and plastic deformation of not only the inclined part 70*g* but also the support member 73 can be suppressed.

Third Embodiment

Figure 4B:
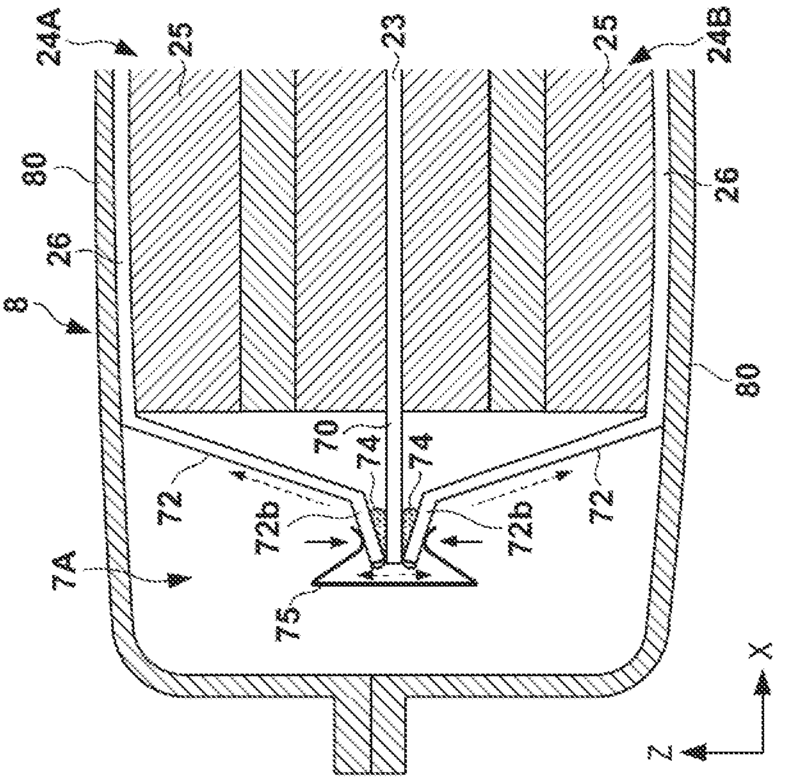
FIG. 4A and FIG. 4B are diagrams illustrating another configuration example of the overcharge suppression part.
Figure 4A:
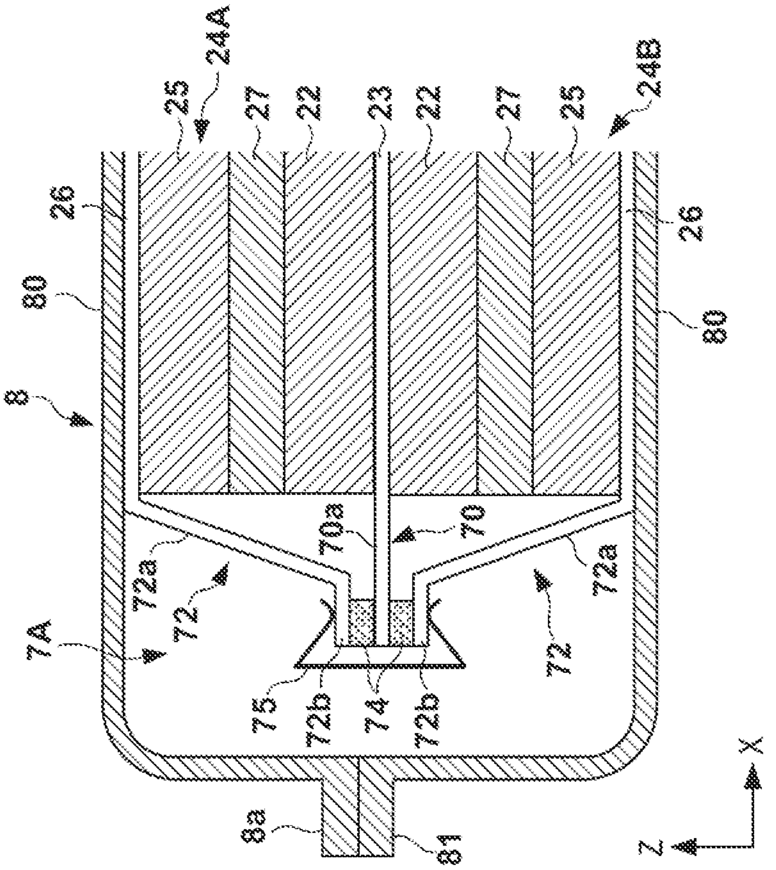

While the overcharge suppression part 7 in the first embodiment brings the conductor 70 and the conductor 72 into contact by utilizing the expansion of the laminated body 2 as the state change of the laminated body 2, heat generation of the laminated body 2 may be utilized. FIG. 4A is a sectional view illustrating a structure of an overcharge suppression part 7A in the present embodiment, and corresponds to the B-B line sectional view of FIG. 1A.

The overcharge suppression part 7A includes the conductors 70 and 72, and the structure of the conductor 72 is the same as the conductor 72 in the first embodiment. The conductor 70 is configured only by the extension part 70*a* in the first embodiment, and does not include the extension parts 70*b* to 70*d*. In the present embodiment, the extension part 70*a* functions as the electric contact part to be in contact with the end part 72*b*.

Between the extension part 70*a* and each end part 72*b*, a hot melt material 74 is interposed respectively. The hot melt material 74 is, for example, an insulating resin material such as PE, PVC, PS, PP and PC. While the laminated body 2 generates heat by the overcharge, a melting point of the hot melt material 74 is the melting point lower than a heat generation temperature at which the laminated body 2 is damaged, and is lower than the melting point of the organic polymer compound based binder which binds particles of the materials configuring the positive electrode active material layer 22, the negative electrode active material layer 25 and the solid electrolyte layer 27, for example. In addition, the melting point of the hot melt material 74 is lower than the melting point of the resin layer included in the all-solid-state battery 1, such as the resin layer of the outer package 8.

The overcharge suppression part 7A includes a biasing member 75. The biasing member 75 biases the conductor 70 and the conductors 72 in the direction of bringing them into contact at a location where the hot melt material 74 is arranged. The biasing member 75 is formed of a spring material for example, and has a shape of holding the two end parts 72*b* in the Z direction in the illustrated example. The biasing member 75 may be entirely covered with the insulating layer.

The action of the overcharge suppression part 7A configured such will be explained with reference to FIG. 4A and FIG. 4B. When the laminated body 2 is appropriately charged and discharged, the extension part 70*a* and the end part 72*b* are not in contact since the hot melt material 74 is interposed between them as illustrated in FIG. 4A, and the conductor 70 and the conductor 72 are not conducted. That is, the positive electrode collector 23 and the negative electrode collector 26 are not short-circuited.

On the other hand, when the laminated body 2 is charged and is overcharged, the laminated body 2 is expanded and generates the heat and the outer package 8 also follows the deformation. The hot melt material 74 is melted by the heat generation, and the end part 72*b* is brought into contact with the extension part 70*a* by energization of the biasing member 75 indicated by a solid line arrow in FIG. 4B. By the contact of the extension part 70*a* and the end part 72*b*, the conductor 70 and the conductor 72 are conducted. As a result, the positive electrode collector 23 and the negative electrode collector 26 are short-circuited to cause the self-discharge (a broken line arrow in FIG. 4B illustrates the current flowing direction). As a result, the overcharge of the laminated body 2 is suppressed.

Even when the charging to the laminated body 2 is ended and the temperature of the laminated body 2 declines, the contact state of the extension part 70*a* and the end part 72*b* is maintained so that the all-solid-state battery 1 becomes unusable thereafter. In this way, in the present embodiment, by the heat generation of the laminated body 2, the conductor 70 and the conductor 72 are irreversibly brought into contact. By using a material having a melting point temperature corresponding to a temperature at which it is difficult to continuously use the laminated body 2 as the hot melt material 74, the all-solid-state battery 1 degraded due to the overcharge can be prevented from being continuously used.

Note that, while the biasing member 75 is used in the present embodiment, a configuration not using the biasing member 75 is also adoptable. In this case, the conductor 72 may be configured by a spring material and the conductor 72 itself may have an elastic behavior in the direction of bringing the end part 72*b* into contact with the extension part 70*a*.

Fourth Embodiment

The present embodiment also utilizes the heat generation of the laminated body 2 similarly to the third embodiment, but conducts the conductor 70 and the conductor 72 by utilizing a change of electric resistance by the temperature.

Figure 5A:
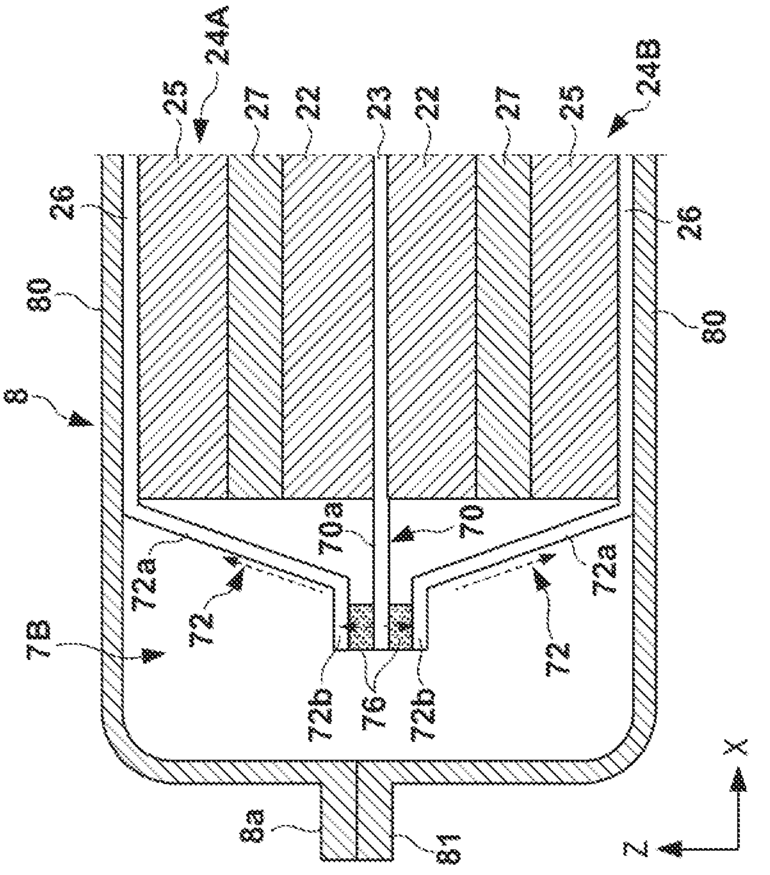
FIG. 5A is a diagram illustrating another configuration example of the overcharge suppression part.

FIG. 5A is a sectional view illustrating a structure of an overcharge suppression part 7B in the present embodiment, and corresponds to the B-B line sectional view of FIG. 1A.

The overcharge suppression part 7B includes the conductors 70 and 72, and the structure of the conductor 72 is the same as the conductor 72 in the first embodiment. The conductor 70 is configured only by the extension part 70*a* in the first embodiment, and does not include the extension parts 70*b* to 70*d*.

Between the extension part 70*a* and each end part 72*b*, an NTC thermistor 76 is interposed respectively. The resistance of the NTC thermistor 76 is changed by the temperature and the resistance is lowered by a rise of the temperature in particular. It is desirable that the NTC thermistor 76 has remarkably large resistance as the resistance corresponding to the temperature at normal time of the laminated body 2, and has remarkably small resistance as the resistance corresponding to the time of the heat generation by the overcharge of the laminated body 2, as the temperature-resistance characteristic thereof.

Figure 5B:
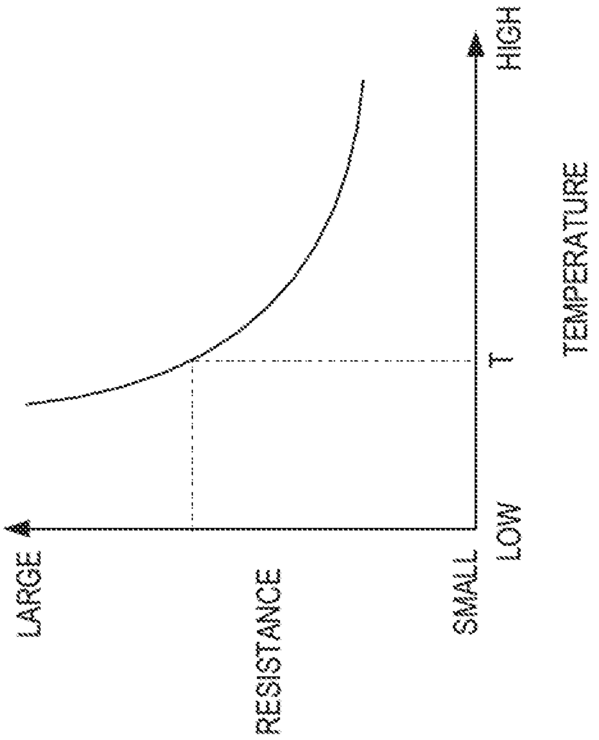
FIG. 5B is a diagram illustrating a characteristic example of an NTC thermistor.

FIG. 5B illustrates an example of the temperature-resistance characteristic of the NTC thermistor 76. A temperature equal to or higher than a temperature T is set as the temperature at the time of the overcharge. At the temperature equal to or higher than the temperature T, the NTC thermistor 76 practically enters a conducted state. The resistance of the NTC thermistor 76 at the temperature T is, for example, equal to the resistance of the solid electrolyte layer 27.

The action of the overcharge suppression part 7B configured such will be explained. When the laminated body 2 is appropriately charged and discharged, the NTC thermistor 76 has predetermined resistance. Since the large resistance is present between the extension part 70*a* and the end part 72*b*, the conductor 70 and the conductor 72 are not practically conducted. That is, the positive electrode collector 23 and the negative electrode collector 26 are not short-circuited.

On the other hand, when the laminated body 2 is charged and is overcharged, the laminated body 2 is expanded and generates the heat and the outer package 8 also follows the deformation. The resistance of the NTC thermistor 76 is lowered by the heat generation. As a result, the extension part 70*a* and the end part 72*b* are conducted. The positive electrode collector 23 and the negative electrode collector 26 are short-circuited to cause the self-discharge (a broken line arrow in FIG. 5A illustrates the current flowing direction). As a result, the overcharge of the laminated body 2 is suppressed.

When the charging to the laminated body 2 is ended and the temperature of the laminated body 2 declines, the resistance of the NTC thermistor 76 increases so that the conductor 70 and the conductor 72 are not practically conducted and the positive electrode collector 23 and the negative electrode collector 26 return to the state of not being short-circuited.

That is, in the overcharge suppression part 7B, the conductor 70 and the conductor 72 are reversibly conducted by the heat generation of the laminated body 2, and are turned to a non-conducted state when the temperature of the laminated body 2 declines. Thus, even when the laminated body 2 temporarily falls into the overcharged state, the laminated body 2 can be continuously used.

Fifth Embodiment

Figure 6A:
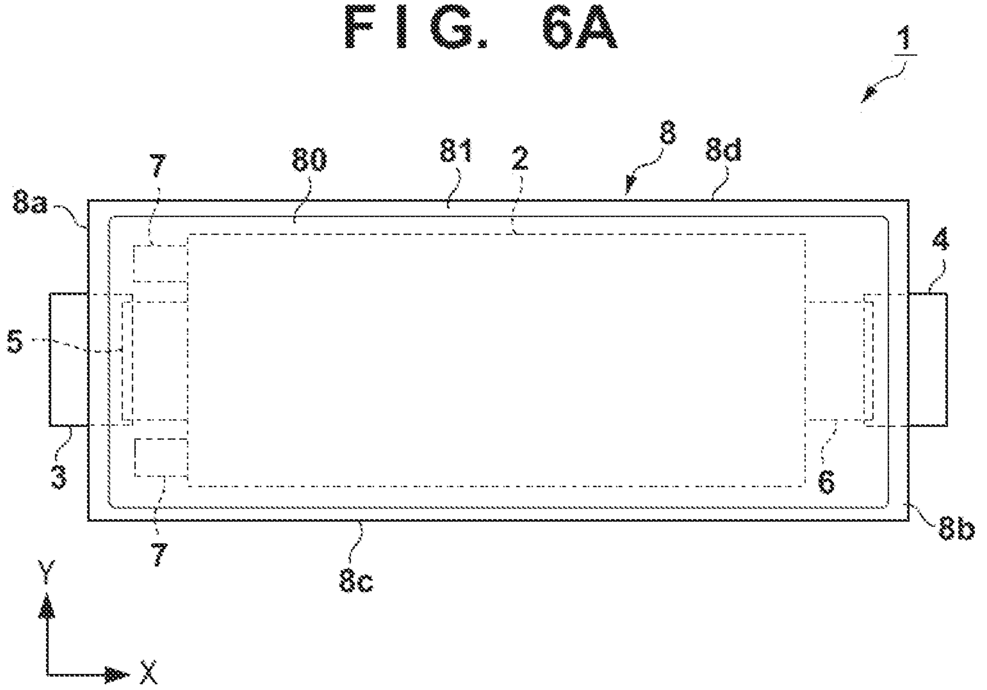
FIG. 6A and FIG. 6B are diagrams illustrating another arrangement example of the overcharge suppression part.

While one overcharge suppression part 7 is arranged at one location in the first embodiment, the plurality of overcharge suppression parts 7 may be arranged at a plurality of locations. FIG. 6A is a plan view of the all-solid-state battery 1 illustrating one example thereof. In the illustrated example, the two overcharge suppression parts 7 are arranged separately in the Y direction between the laminated body 2 and the side 8*a* inside the outer package 8. The two overcharge suppression parts 7 are provided independent of the lead tabs 3 and 4 and the collector tabs 5 and 6 and are arranged at positions to hold the collector tab 5 therebetween in the Y direction. By providing the plurality of overcharge suppression parts 7, the overcharge of the laminated body 2 can be more certainly suppressed. In addition, by arranging the overcharge suppression parts 7 at the different positions in the Y direction, even when an expanded location of the laminated body 2 by the overcharge is unbalanced, the conductor 70 and the conductor 72 are short-circuited by the overcharge suppression part 7 at the corresponding location and the overcharge of the laminated body 2 can be suppressed.

While the overcharge suppression parts 7 are arranged between the laminated body 2 and the side 8*a* in the example in FIG. 6A, the overcharge suppression part of a function similar to the overcharge suppression part 7 may be arranged between the laminated body 2 and the side 8*b*. Further, the overcharge suppression part may be arranged respectively between the laminated body 2 and the side 8*a* and between the laminated body 2 and the side 8*b*. While the plurality of overcharge suppression parts 7 are arranged at the plurality of locations in the example in FIG. 6A, the plurality of overcharge suppression parts 7A or overcharge suppression parts 7B may be arranged at the plurality of locations.

Figure 6B:
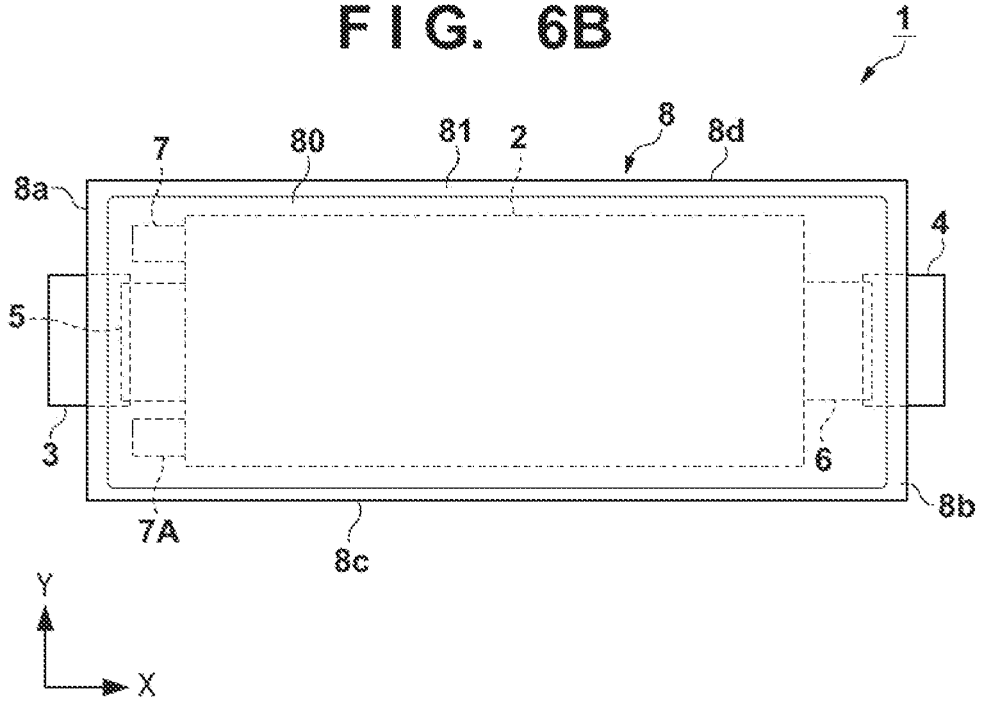

Further, the overcharge suppression parts of different kinds may be arranged at the plurality of parts. FIG. 6B illustrates one example thereof. In the illustrated example, two kinds of the overcharge suppression part 7 and the overcharge suppression part 7A are separately arranged in the Y direction between the laminated body 2 and the side 8*a* inside the outer package 8. Generally, the state change of the laminated body 2 accompanying the overcharge causes the expansion first and causes the heat generation of a high temperature thereafter. While a service life as a battery is often over when the heat generation is caused, the battery is often continuously usable in a stage of the expansion.

In the case of the configuration example in FIG. 6B, the overcharge of the laminated body 2 is suppressed by the overcharge suppression part 7 in the stage of the expansion which is a first stage of the overcharge. As described above, since the overcharge suppression part 7 is the structure that reversibly short-circuits the positive electrode collector 23 and the negative electrode collector 26, the all-solid-state battery 1 can be continuously used. On the other hand, in the stage of the heat generation which is a second stage of the overcharge, the overcharge of the laminated body 2 is suppressed by the overcharge suppression part 7A. As described above, since the overcharge suppression part 7A is the structure that irreversibly short-circuits the positive electrode collector 23 and the negative electrode collector 26, the all-solid-state battery 1 can be made unusable thereafter.

Sixth Embodiment

Figure 7B:
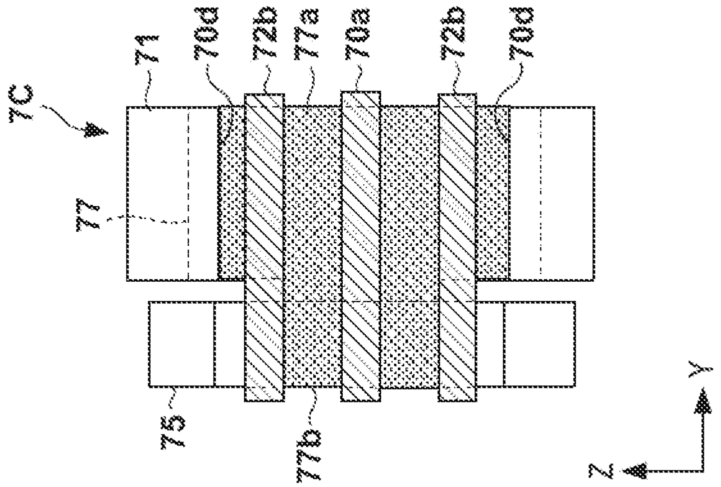
FIG. 7A and FIG. 7B are diagrams illustrating another configuration example of the overcharge suppression part.
Figure 7A:
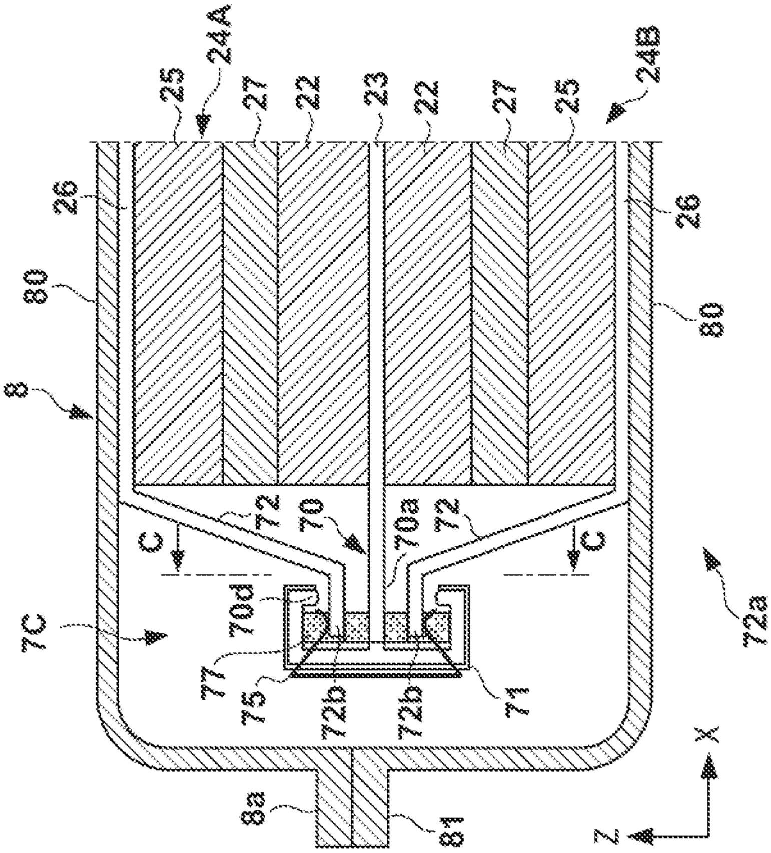

One overcharge suppression part may be configured by combining the individual overcharge suppression parts 7 and 7A in the first embodiment and the third embodiment. That is, the overcharge suppression parts 7 and 7A at the two locations in FIG. 6B may be configured as one overcharge suppression part. FIG. 7A is a sectional view illustrating a structure of the overcharge suppression part 7C in the present embodiment, and corresponds to the B-B line sectional view of FIG. 1A. FIG. 7B is a C-C line sectional view of FIG. 7A.

The overcharge suppression part 7C has a structure that the extension parts 70*b* to 70*d* of the overcharge suppression part 7 and the biasing member 75 of the overcharge suppression part 7A are arranged in the Y direction, and includes a hot melt material 77 for which the support member 73 of the overcharge suppression part 7 and the hot melt material 74 of the overcharge suppression part 7A are integrated. The hot melt material 77 includes a part 77*a* which functions as the support member 73 of the overcharge suppression part 7, and a part 77*b* which functions as the hot melt material 74 of the overcharge suppression part 7A, and the material is the same as the hot melt material 74.

In the overcharge suppression part 7C configured such, in the stage of the expansion which is the first stage of the overcharge, the extension part 70*d* and the end part 72*b* are brought into contact by displacement of the conductor 72 accompanying the expansion, the positive electrode collector 23 and the negative electrode collector 26 are reversibly short-circuited, and the overcharge of the laminated body 2 is suppressed. On the other hand, in the stage of the heat generation which is the second stage of the overcharge, the extension part 70*a* and the end part 72*b* are brought into contact by melting of the hot melt material 77, the positive electrode collector 23 and the negative electrode collector 26 are irreversibly short-circuited, and the overcharge of the laminated body 2 is suppressed. The all-solid-state battery 1 can be made unusable thereafter.

Summary of Embodiments

The embodiments described above disclose at least the following all-solid-state batteries.

1. An all-solid-state battery (1) in the embodiment comprises:
  - a laminated body (2) in which a positive electrode layer (21A,21B), a solid electrolyte layer (27) and a negative electrode layer (24A,24B) are laminated;
  - an outer package (8) configured to enclose and seal in the laminated body and being capable of following deformation in a lamination direction (Z) of the laminated body (2); and
  - an overcharge suppression part (7-7C) configured to be enclosed and sealed in the outer package (8) together with the laminated body (2) and be capable of short-circuiting a positive electrode collector (23) of the positive electrode layer (21A,21B) and a negative electrode collector (26) of the negative electrode layer (24A,24B),
  - wherein the overcharge suppression part (7-7C) includes:
  - a first conductor (70) extending from one of the positive electrode collector (23) and the negative electrode collector (26); and
  - a second conductor (72) extending from another of the positive electrode collector (23) and the negative electrode collector (26) and separated from the first conductor (70), and
  - the first conductor (70) and the second conductor (72) are conducted by a state change of the laminated body (2).

According to the embodiment, it is possible to provide the all-solid-state battery capable of suppressing the overcharge with no special structure being disposed outside the outer package. Differently from the aqueous secondary battery, there is no liquid inside the outer package of the all-solid-state battery. Therefore, the short-circuit and short-circuit cancellation of the positive electrode collector and the negative electrode collector can be more certainly performed by using the conductors inside the outer package.

2. In the embodiment, the first conductor (70) and the second conductor (72) are brought into contact and conducted by expansion in the lamination direction (Z) of the laminated body (2) as the state change.

According to the embodiment, it is possible to short-circuit the positive electrode collector and the negative electrode collector by utilizing the displacement of the conductor by the expansion of the laminated body.

3. In the embodiment, the overcharge suppression part (7A) includes a hot melt material (74) interposed between the first conductor (70) and the second conductor (72), and
  - the first conductor (70) and the second conductor (72) are brought into contact and conducted by melting of the hot melt material (74) by heat generation of the laminated body (2) as the state change.

According to the embodiment, it is possible to short-circuit the positive electrode collector and the negative electrode collector by utilizing the melting of the hot melt material by the heat generation of the laminated body.

4. In the embodiment (FIGS. 6B and 7A), the overcharge suppression part (7, 7A, 7C) includes a hot melt material (74, 77) interposed between the first conductor (70) and the second conductor (72),
  - the first conductor (70) and the second conductor (72) are reversibly brought into contact and conducted by expansion in the lamination direction (Z) of the laminated body (2) as the state change, and
  - the first conductor (70) and the second conductor (72) are irreversibly brought into contact and conducted by melting of the hot melt material (74, 77) by heat generation of the laminated body (2) as the state change.

According to the embodiment, it is possible to short-circuit the conductors so as to enable continuous use when the stage of the overcharge is the expansion stage, and to short-circuit the conductors so as to disable the continuous use when it is the heat generation stage.

5. In the embodiment, the overcharge suppression part (7B) includes an NTC thermistor (76) interposed between the first conductor (70) and the second conductor (72), and
  - the first conductor (70) and the second conductor (72) are conducted by decline of a resistance value of the NTC thermistor (76) due to heat generation of the laminated body (2) as the state change.
  - According to the embodiment, it is possible to short-circuit the positive electrode collector and the negative electrode collector by utilizing a resistance change of the NTC thermistor by the heat generation of the laminated body.

6. In the embodiment, the first conductor (70) includes a first electric contact part (70*d*, 70*f*, 70*h*),
  - the second conductor (72) includes a second electric contact part (72*b*) to be brought into contact with the first electric contact part (70*d*, 70*f*, 70*h*) by the expansion, and
  - the first electric contact part (70*f*) and the second electric contact part (72*b*) are flat surfaces.

According to the embodiment, it is possible to conduct the conductors by more certainly bringing the electric contact parts into contact when the laminated body is expanded.

7. In the embodiment, the first conductor (70) includes a first electric contact part (70*d*, 70*f*, 70*h*), the second conductor (72) includes a second electric contact part (72*b*) to be brought into contact with the first electric contact part (70*d*, 70*f*, 70*h*) by the expansion, the first conductor (70) includes an inclined part (70*e*, 70*g*) inclined in a direction of approaching the second electric contact part (72*b*), and the first electric contact part (70*f*, 70*h*) is provided on an end of the inclined part (70*e*, 70*g*) closer to the second electric contact part (72*b*).

According to the embodiment, the electric contact parts can be repeatedly brought into contact and separated by the elastic deformation of the inclined part.

8. In the embodiment, the first conductor includes (70):

a first extension part (70*a*) extending in a direction of separating from the laminated body (2);

a second extension part (70*b*) bent from the first extension part (70*a*) and extending in one direction of the lamination direction (Z);

a third extension part (70*c*) bent from the second extension part (70*b*) and extending in a direction of approaching the laminated body (2); and a fourth extension part (70*e*, 70*f*, 70*g*, 70*h*) bent from the third extension part (70*c*) and extending in another direction of the lamination direction (Z), and the second conductor (72) includes an end part (72*b*) inserted between the first extension part (70*a*) and the third extension part (70*c*).

According to the embodiment, a stable operation is made possible by limiting a contact location when the laminated body is expanded.

9. In the embodiment, the overcharge suppression part (7) includes a support member (73) which is provided to fill a gap between the first extension part (70*a*) and the third extension part (70*c*) and supports the end part (72*b*), the fourth extension part (70*g*, 70*h*) is inclined in the direction of approaching the laminated body (2) in the other direction from the third extension part (70*c*), and the support member (73) includes a part (73*a*) along an inclination of the fourth extension part (70*g*, 70*h*).

According to the embodiment, it is possible to suppress the action of the large stress between the inclined part and the support member when the inclined part and the part of the support member are brought into contact again after they are separated.

10. In the embodiment, the overcharge suppression part (7A, 7C) includes a biasing member (75) configured to bias the first conductor (70) and the second conductor (72) in a direction of bringing the first conductor and the second conductor into contact, at a location where the hot melt material (73, 77) is arranged.

According to the embodiment, it is possible to more certainly bring the conductors into contact with each other when the hot melt material is melted.

11. The all-solid-state battery in the embodiment, further comprises:

a first lead tab (3); and a second lead tab (4), wherein the laminated body (2) is arranged between the first lead tab (3) and the second lead tab (4), the outer package (8) has a rectangular shape having four sides (8*a*-8*d*) as viewed in the lamination direction (Z), and the overcharge suppression part (7-7C) is positioned between the laminated body (2) and a side (8*a*, 8*b*) provided with the first lead tab (3) or the second lead tab (4) among the four sides (8*a*-8*d*).

According to the embodiment, it is possible to arrange the overcharge suppression part by utilizing a free area inside the outer package.

12. In the embodiment, a melting point of the hot melt material (73, 77) is lower than a melting point of a binder included in the positive electrode layer (21A, 21B), the negative electrode layer (24A, 24B) or the solid electrolyte layer (27).

According to the embodiment, it is possible to suppress the overcharge before the laminated body is damaged.

13. In the embodiment, the negative electrode layer (24A, 24B) includes a lithium-based material, a silicon-based material or a tin-based material as a negative electrode active material.

According to the embodiment, it is possible to prevent the overcharge in the all-solid-state battery using the lithium-based material, the silicon-based material or the tin-based material of the relatively large expansion at the time of the overcharge as the negative electrode active material.

14. In the embodiment, the positive electrode layer (21A, 21B) includes:

two positive electrode active material layers (22) in the lamination direction (Z); and the positive electrode collector (23) in common between the two positive electrode active material layers (22), the negative electrode layer (24A, 24B) includes:

a first negative electrode layer (24A) on an outer side in one direction of the lamination direction to the positive electrode layer (21A,21B); and a second negative electrode layer (24B) on an outer side in another direction of the lamination direction to the positive electrode layer (21A, 21B), the negative electrode collector includes (26):

a first negative electrode collector (26) included in the first negative electrode layer (24A) and positioned in an outermost layer in the one direction in the lamination direction of the laminated body; and a second negative electrode collector (26) included in the second negative electrode layer (24B) and positioned in an outermost layer in the other direction in the lamination direction of the laminated body, the first conductor (70) extends from the positive electrode collector (23), and the second conductor (72) includes a conductor (72) extending from the first negative electrode collector (26) and a conductor (72) extending from the second negative electrode collector (26).

According to the embodiment, it is possible to prevent the overcharge for each layer.

15. In the embodiment, the first conductor (70) includes a first electric contact part (70*d*, 70*f*. 70*h*), the second conductor (72) includes a second electric contact part to be brought into contact with the first electric contact part by the expansion, and the first conductor includes a part covered with an insulating layer (71).

According to the embodiment, it is possible to prevent the unintended contact of the first conductor and the second conductor.

16. The all-solid-state battery in the embodiment, further comprises a lead tab (3, 4) and a collector tab (5, 6), wherein the overcharge suppression part (7, 7A, 7B) is provided independent of the lead tab and the collector tab.

According to the embodiment, it is possible to prevent physical influence such as breakage from being exerted to the lead tab and the collector tab by the overcharge suppression part.

While an embodiment has been described, the invention is not limited to the foregoing embodiments, and various variations/changes are possible within the spirit of the invention.

What is claimed is:

1. An all-solid-state battery comprising:

a laminated body in which a positive electrode layer, a solid electrolyte layer and a negative electrode layer are laminated;

an outer package configured to enclose and seal in the laminated body and being capable of conforming to deformation in a lamination direction of the laminated body; and an overcharge suppression part configured to be enclosed and sealed in the outer package together with the laminated body and be capable of short-circuiting a positive electrode collector of the positive electrode layer and a negative electrode collector of the negative electrode layer, wherein the overcharge suppression part includes:

a first conductor extending from one of the positive electrode collector and the negative electrode collector; and a second conductor extending from another of the positive electrode collector and the negative electrode collector and separated from the first conductor, and the first conductor and the second conductor are brought into contact and electrically connected by expansion in the lamination direction of the laminated body.

2. The all-solid-state battery according to claim 1, wherein the overcharge suppression part includes a hot melt material interposed between the first conductor and the second conductor, the first conductor and the second conductor are reversibly brought into contact and electrically connected by expansion in the lamination direction of the laminated body, and the first conductor and the second conductor are irreversibly brought into contact and electrically connected by melting of the hot melt material by heat generation of the laminated body.

3. The all-solid-state battery according to claim 2, wherein the overcharge suppression part includes a biasing member configured to bias the first conductor and the second conductor in a direction of bringing the first conductor and the second conductor into contact, at a location where the hot melt material is arranged.

4. The all-solid-state battery according to claim 2, wherein a melting point of the hot melt material is lower than a melting point of a binder included in the positive electrode layer, the negative electrode layer or the solid electrolyte layer.

5. The all-solid-state battery according to claim 1, wherein the first conductor includes a first electric contact part, the second conductor includes a second electric contact part to be brought into contact with the first electric contact part by the expansion, and the first electric contact part and the second electric contact part are flat surfaces.

6. The all-solid-state battery according to claim 1, wherein the first conductor includes a first electric contact part, the second conductor includes a second electric contact part to be brought into contact with the first electric contact part by the expansion, the first conductor includes an inclined part inclined in a direction of approaching the second electric contact part, and the first electric contact part is provided on an end of the inclined part closer to the second electric contact part.

7. The all-solid-state battery according to claim 1, further comprising:

a first lead tab; and a second lead tab, wherein the laminated body is arranged between the first lead tab and the second lead tab, the outer package has a rectangular shape having four sides as viewed in the lamination direction, and the overcharge suppression part is positioned between the laminated body and a side provided with the first lead tab or the second lead tab among the four sides.

8. The all-solid-state battery according to claim 1, wherein the negative electrode layer includes a lithium-based material, a silicon-based material or a tin-based material as a negative electrode active material.

9. The all-solid-state battery according to claim 1, wherein the first conductor includes a first electric contact part, the second conductor includes a second electric contact part to be brought into contact with the first electric contact part by the expansion, and the first conductor includes a part covered with an insulating layer.

10. The all-solid-state battery according to claim 1, further comprising a lead tab and a collector tab, wherein the overcharge suppression part is provided independent of the lead tab and the collector tab.

11. The all-solid-state battery according to claim 1, wherein the first conductor includes a first portion laminated with the laminated body, the second conductor includes a second portion laminated with the laminated body, and the first portion is located outward of the second portion in the lamination direction of the laminated body.

12. An all-solid-state battery comprising:

a laminated body in which a positive electrode layer, a solid electrolyte layer and a negative electrode layer are laminated;

an outer package configured to enclose and seal in the laminated body and being capable of conforming to deformation in a lamination direction of the laminated body; and an overcharge suppression part configured to be enclosed and sealed in the outer package together with the laminated body and be capable of short-circuiting a positive electrode collector of the positive electrode layer and a negative electrode collector of the negative electrode layer, wherein the overcharge suppression part includes:

a first conductor extending from one of the positive electrode collector and the negative electrode collector; and a second conductor extending from another of the positive electrode collector and the negative electrode collector and separated from the first conductor, the first conductor and the second conductor are brought into contact and electrically connected by expansion in the lamination direction of the laminated body, the first conductor includes:

a first extension part extending in a direction of separating from the laminated body;

a second extension part bent from the first extension part and extending in one direction of the lamination direction;

a third extension part bent from the second extension part and extending in a direction of approaching the laminated body; and a fourth extension part bent from the third extension part and extending in another direction of the lamination direction, and the second conductor includes an end part inserted between the first extension part and the third extension part.

13. The all-solid-state battery according to claim 12, wherein the overcharge suppression part includes a support member which is provided to fill a gap between the first extension part and the third extension part and supports the end part, the fourth extension part is inclined in the direction of approaching the laminated body in the other direction from the third extension part, and the support member includes a part along an inclination of the fourth extension part.

14. An all-solid-state battery comprising:

a laminated body in which a positive electrode layer, a solid electrolyte layer and a negative electrode layer are laminated;

an outer package configured to enclose and seal in the laminated body and being capable of conforming to deformation in a lamination direction of the laminated body; and an overcharge suppression part configured to be enclosed and sealed in the outer package together with the laminated body and be capable of short-circuiting a positive electrode collector of the positive electrode layer and a negative electrode collector of the negative electrode layer, wherein the overcharge suppression part includes:

a first conductor extending from one of the positive electrode collector and the negative electrode collector; and a second conductor extending from another of the positive electrode collector and the negative electrode collector and separated from the first conductor, the first conductor and the second conductor are electrically connected by a state change of the laminated body, the positive electrode layer includes:

two positive electrode active material layers in the lamination direction; and the positive electrode collector in common between the two positive electrode active material layers, the negative electrode layer includes:

a first negative electrode layer on an outer side in one direction of the lamination direction to the positive electrode layer; and a second negative electrode layer on an outer side in another direction of the lamination direction to the positive electrode layer, the negative electrode collector includes:

a first negative electrode collector included in the first negative electrode layer and positioned in an outermost layer in the one direction in the lamination direction of the laminated body; and a second negative electrode collector included in the second negative electrode layer and positioned in an outermost layer in the other direction in the lamination direction of the laminated body, the first conductor extends from the positive electrode collector, and the second conductor includes a conductor extending from the first negative electrode collector and a conductor extending from the second negative electrode collector.

* * * * *